US012563122B2

(12) United States Patent
Kweon et al.

(10) Patent No.: US 12,563,122 B2
(45) Date of Patent: Feb. 24, 2026

(54) METHOD FOR ALLOCATING GROUP ID FOR GROUP TRANSMISSION OF PFCP SESSION CONTEXTS, AND APPARATUS THEREFOR

(71) Applicant: SAMSUNG ELECTRONICS CO., LTD., Suwon-si (KR)

(72) Inventors: Kisuk Kweon, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 18/717,994

(22) PCT Filed: Dec. 8, 2022

(86) PCT No.: PCT/KR2022/019957
§ 371 (c)(1),
(2) Date: Jun. 7, 2024

(87) PCT Pub. No.: WO2023/106865
PCT Pub. Date: Jun. 15, 2023

(65) Prior Publication Data
US 2025/0055920 A1 Feb. 13, 2025

(30) Foreign Application Priority Data
Dec. 8, 2021 (KR) ........................ 10-2021-0174675

(51) Int. Cl.
*G06F 15/16* (2006.01)
*H04L 67/141* (2022.01)
(Continued)

(52) U.S. Cl.
CPC .......... *H04L 67/141* (2013.01); *H04L 67/146* (2013.01); *H04W 76/10* (2018.02)

(58) Field of Classification Search
CPC ..... H04L 67/141; H04L 67/146; H04W 76/10
(Continued)

(56) References Cited

U.S. PATENT DOCUMENTS 7,065,066 B2 * 6/2006 Mizutani ................. H04M 3/42
370/261
9,319,320 B2 * 4/2016 Bao ........................ H04L 47/125
(Continued)

FOREIGN PATENT DOCUMENTS

CN 112312466 A 2/2021
KR 10-2021-0128484 A 10/2021
(Continued)

OTHER PUBLICATIONS

Supplementary European Search Report dated Feb. 12, 2025, in connection with European Patent Application No. 22904694.1, 85 pages.
(Continued)

*Primary Examiner* — Moustafa M Meky

(57) ABSTRACT

The present disclosure relates to: a communication technique for merging an IoT technology with a 5G communication system for supporting a higher data transmission rate than a 4G system; and a system therefor. The present disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. An embodiment of the present disclosure proposes a method for determining the recovery order of a PFCP session by allowing a priority to be included when allocating a group ID for group transmission of PFCP session contexts.

15 Claims, 9 Drawing Sheets

(51) Int. Cl.
  *H04L 67/146* (2022.01)
  *H04W 76/10* (2018.01)
(58) Field of Classification Search
  USPC ........................................................ 709/228
  See application file for complete search history.

(56) References Cited

U.S. PATENT DOCUMENTS

| | | | | |
|---|---|---|---|---|
| 11,343,653 B2 * | 5/2022 | Talebi Fard | .......... | H04W 8/186 |
| 11,399,405 B2 * | 7/2022 | Hu | ......................... | H04W 76/11 |
| 11,678,402 B2 * | 6/2023 | Dhammawat | ......... | H04L 67/143 |
| | | | | 709/227 |
| 11,979,798 B2 * | 5/2024 | Talebi Fard | .......... | H04W 8/186 |
| 12,022,319 B2 * | 6/2024 | Puente | .............. | H04W 28/0268 |
| 12,156,292 B2 * | 11/2024 | Dhammawat | ....... | H04L 41/0816 |
| 2007/0243879 A1 * | 10/2007 | Park | ......................... | H04L 47/20 |
| | | | | 455/453 |
| 2008/0232310 A1 * | 9/2008 | Xu | .................... | H04W 52/0216 |
| | | | | 370/329 |
| 2012/0163167 A1 * | 6/2012 | Dade | ................. | H04W 28/0273 |
| | | | | 370/229 |
| 2020/0228936 A1 * | 7/2020 | Talebi Fard | ............ | H04W 4/08 |
| 2020/0404733 A1 * | 12/2020 | Hu | ......................... | H04W 36/00 |
| 2022/0022092 A1 * | 1/2022 | Puente Pestaña | ........................... | |
| | | | | H04W 28/0263 |
| 2022/0159446 A1 | 5/2022 | Zhou et al. | | |
| 2022/0183098 A1 | 6/2022 | Zhu et al. | | |
| 2022/0217814 A1 * | 7/2022 | Dhammawat | ....... | H04L 41/0806 |
| 2022/0232051 A1 | 7/2022 | Zhu et al. | | |
| 2022/0248185 A1 * | 8/2022 | Talebi Fard | .......... | H04W 8/186 |
| 2022/0304104 A1 | 9/2022 | Mihály et al. | | |
| 2023/0254942 A1 * | 8/2023 | Dhammawat | ......... | H04W 76/11 |
| | | | | 709/227 |
| 2024/0275636 A1 * | 8/2024 | Wang | ................. | H04L 12/4641 |

FOREIGN PATENT DOCUMENTS

| | | | |
|---|---|---|---|
| WO | 2020228471 A1 | 11/2020 |
| WO | 2020254024 A1 | 12/2020 |

OTHER PUBLICATIONS

International Search Report and Written Opinion of the International Searching Authority dated Mar. 17, 2023, in connection with International Application No. PCT/KR2022/019957, 10 pages.
3GPP TS 23.007 V17.2.0 (Sep. 2021), Technical Specification, 3rd Generation Partnership Project; Technical Specification Group Core Network and Terminals; Restoration procedures; (Release 17), Sep. 2021, 116 pages.
3GPP TS 29.244 V17.2.1 (Sep. 2021), Technical Specification, 3rd Generation Partnership Project; Technical Specification Group Core Network and Terminals; Interface between the Control Plane and the User Plane Nodes; Stage 3 (Release 17), Sep. 2021, 356 pages.
3GPP TS 29.502 V17.2.0 (Sep. 2021), 3rd Generation Partnership Project; Technical Specification Group Core Network and Terminals; 5G System; Session Management Services; Stage 3 (Release 17), Sep. 2021, 306 pages.
3GPP TS 29.244 V17.1.0 (Jun. 2021); Technical Specification; 3rd Generation Partnership Project; Technical Specification Group Core Network and Terminals; Interface between the Control Plane and the User Plane Nodes; Stage 3 (Release 17); 345 pages.
3GPP TS 29.502 V17.1.0 (Jun. 2021); Technical Specification; 3rd Generation Partnership Project; Technical Specification Group Core Network and Terminals; 5G System; Session Management Services; Stage 3 (Release 17); 299 pages.
3GPP TS 23.527 V17.1.0 (Jun. 2021); Technical Specification; 3rd Generation Partnership Project; Technical Specification Group Core Network and Terminals; 5G System; Restoration Procedures (Release 17); 30 pages.

* cited by examiner

FIG. 1

1. PDU SESSION ESTABLISHMENT REQUEST

2. SM context generation

N4     3. PFCP Session Establishment Request

4. PFCP session context stores

FIG. 3

| Bits | | | | | | | | |
|---|---|---|---|---|---|---|---|---|
| Octets | 8 | 7 | 6 | 5 | 4 | 3 | 2 | 1 |
| 1 to 2 | Type = 291 (decimal) | | | | | | | |
| 3 to 4 | length = n | | | | | | | |
| 5 to n+4 | group ID | | | | | | | |

FIG. 5

| Bits | | | | | | | | |
|---|---|---|---|---|---|---|---|---|
| Octets | 8 | 7 | 6 | 5 | 4 | 3 | 2 | 1 |
| 1 to 2 | Type = 29x (decimal) | | | | | | | |
| 3 to 4 | length = n | | | | | | | |
| 5 to n+4 | priority of group ID | | | | | | | |

SMF recovery of PFCP session

Figure 7:
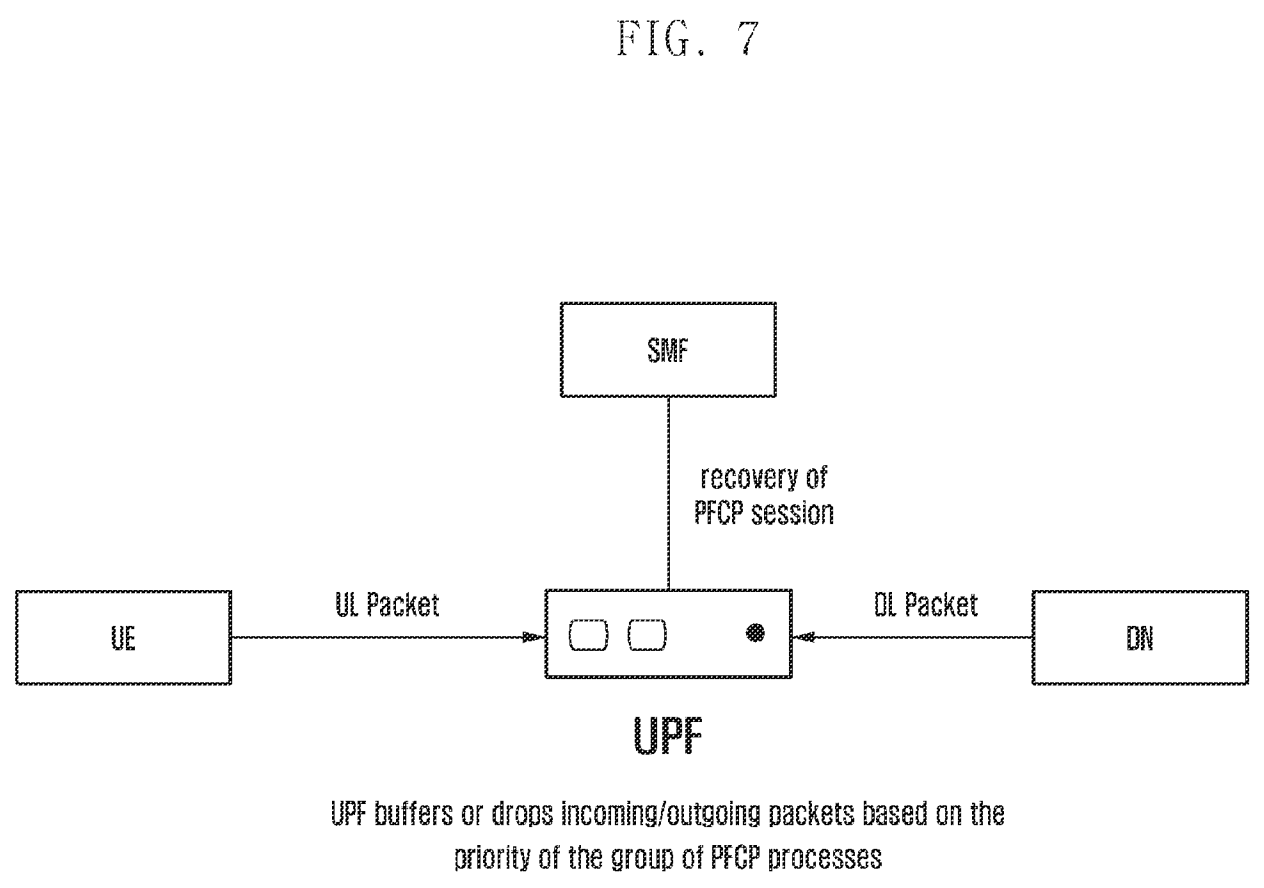

UE

UL Packet

UPF

UPF buffers or drops incoming/outgoing packets based on the priority of the group of PFCP processes DL Packet

DN

METHOD FOR ALLOCATING GROUP ID FOR GROUP TRANSMISSION OF PFCP SESSION CONTEXTS, AND APPARATUS THEREFOR

TECHNICAL FIELD

The disclosure relates to a communication system, particularly, proposes a method for determining the recovery order of a PFCP session by allowing a priority to be included when allocating a group ID for group transmission of packet forwarding control protocol (PFCP) session contexts.

BACKGROUND ART

In order to meet wireless data traffic demands that have increased after 4th Generation (4G) communication system commercialization, efforts to develop an improved 5G communication system or a pre-5G communication system have been made. For this reason, the 5G communication system or pre-5G communication system is called a beyond-4G-network communication system or a post-long term evolution (LTE) system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large-scale antenna technologies are being discussed as means to mitigate a propagation path loss in the ultrahigh-frequency band and increase a propagation transmission distance.

Further, technologies such as evolved small cell, advanced small cell, cloud Radio Access Network (RAN), ultra-dense network, Device-to-Device communication (D2D), wireless backhaul, moving network, cooperative communication, Coordinated Multi-Points (COMP), and received interference cancellation have been developed in order to improve the system network in the 5G communication system.

In addition, the 5G system has developed advanced coding modulation (ACM) schemes such as hybrid frequency shift keying and quadrature amplitude modulation (FQAM) and sliding window superposition coding (SWSC), and has further developed advanced access technologies such as filter bank multi carrier (FBMC), non orthogonal multiple access (NOMA), and sparse code multiple access (SCMA).

In the 5G system, the support of various services for the existing 4G system is taken into consideration. For example, most representative services may include enhanced mobile broad band (eMBB), ultra-reliable and low latency communication (URLLC), massive machine type communication (mMTC), evolved multimedia broadcast/multicast service (eMBMS), etc. Furthermore, a system providing the URLLC service may be called a URLLC system, and a system providing the eMBB service may be called an eMBB system. Furthermore, terms, such as service and system, may be interchangeably used.

From among the services, the URLLC service is newly taken into consideration in the 5G system unlike the existing 4G system and requires the satisfaction of ultra-high reliability (e.g., a packet error rate of about 10-5) and low latency (e.g., about 0.5 msec) conditions, compared to other services. In order to satisfy such strict requirements, the URLLC service may need to apply a short transmission time interval (TTI) compared to the eMBB service. Various operation methods using the TTI are taken into consideration.

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted.

In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries. Accordingly, various attempts to apply the 5G communication to the IoT network are made. For example, technologies such as a sensor network, Machine to Machine (M2M), and Machine Type Communication (MTC) are implemented by beamforming, MIMO, array antenna schemes, etc., which are 5G communication technologies. The application of a cloud radio access network (RAN) as the big data processing technology may be an example of convergence of the 5G technology and the IoT technology.

As various services can be provided in accordance with the above-mentioned and the development of mobile communication systems, there is a need for methods to efficiently use non-public network (NPN) in particular.

DISCLOSURE OF INVENTION

Technical Problem

The disclosure is to provide a method and apparatus that can effectively provide services in a wireless communication system.

In addition, an object of the disclosure is to provide a method for determining the recovery order of a PFCP session by allowing a priority to be included when allocating a group ID for group transmission of packet forwarding control protocol (PFCP) session contexts.

The technical objects to be achieved by the disclosure are not limited to the technical objects mentioned above, and other technical objects not mentioned may be clearly understood by those skilled in the art from the following descriptions.

Solution to Problem

In order to solve the above problems, a method performed by a session management function (SMF) in a wireless communication system of the disclosure comprises transmitting, to a second SMF, an SM context including a group identifier (ID); transmitting, to a user plane function (UPF), a message requesting a packet forwarding control protocol (PFCP) session context including the group ID; and receiving a response message to the request message from the UPF.

In an embodiment, the group ID includes information about priority, and the information about the priority is bit information.

In an embodiment, the SM context and the PFCP session context further include priority of the group ID.

In an embodiment, the method further comprises transmitting, to the second SMF, a message requesting recovery of the SM context; and receiving, from the second SMF, a message responding to the request.

In addition, in another embodiment of the disclosure, a method performed by a user plane function (UPF) in a wireless communication system, comprises receiving a message requesting a packet forwarding control protocol (PFCP) session context including a group identifier (ID) from a session management function (SMF); and transmitting, to the SMF, a response message to the request message, wherein an SM context including the group ID is transmitted from the SMF to a second SMF.

In addition, in another embodiment of the disclosure, a session management function (SMF) comprises a transceiver capable of transmitting and receiving at least one signal; and a controller coupled with the transceiver, wherein the controller is configured to transmit, to a second SMF, an SM context including a group identifier (ID), transmit, to a user plane function (UPF), a message requesting a packet forwarding control protocol (PFCP) session context including the group ID, and receive a response message to the request message from the UPF.

In addition, in another embodiment of the disclosure, a user plane function (UPF), comprises a transceiver capable of transmitting and receiving at least one signal; and a controller coupled with the transceiver, wherein the controller is configured to receive a message requesting a packet forwarding control protocol (PFCP) session context including a group identifier (ID) from a session management function (SMF); and transmit, to the SMF, a response message to the request message, wherein an SM context including the group ID is transmitted from the SMF to a second SMF. In addition, according to an embodiment of the disclosure, when the session management function (SMF) has a problem or is replaced, the SMF must be changed to a new SMF that will manage the user plane functions (UPFs) managed by the SMF. In this case, the SMF that manages the packet forwarding control protocol (PFCP) may be changed to a new SMF by grouping the PFCPs, instead of changing to the new SMF individually for each PFCP.

In addition, in an embodiment of the disclosure, when changing the management of an existing PFCP group to a new SMF, a recovery order is required depending on the urgency or importance of the PFCP session context. Thus, a group ID allocation method that may determine the group recovery order by including priority in the group ID when allocating a PFCP group ID may be provided.

Advantageous Effects of Invention

According to an embodiment of the disclosure, a method and apparatus that can effectively provide services in a wireless communication system may be provided.

In addition, an embodiment of the disclosure may provide a method for determining the recovery order of a PFCP session by allowing a priority to be included when allocating a group ID for group transmission of packet forwarding control protocol (PFCP) session contexts.

Effects which may be obtained in the disclosure are not limited to the aforementioned effects, and other technical effects not described above may be evidently understood by a person having ordinary skill in the art to which the disclosure pertains from the following description.

BRIEF DESCRIPTION OF DRAWINGS

FIG. 1 is a diagram illustrating a structure of a 5G network according to an embodiment of the disclosure.

FIG. 3 is a diagram illustrating an information element (IE) of an existing group ID.

FIG. 5 is a diagram illustrating an example of a method for defining a new IE for a group ID according to an embodiment of the disclosure.

FIG. 6 is a diagram illustrating an example of a recovery procedure for SM contexts managed by a SMF before a SMF recovery procedure according to an embodiment of the disclosure.

FIG. 7 is a diagram illustrating an example of packet flow handling that occurs during recovery of PFCP sessions according to an embodiment of the disclosure.

MODE FOR THE INVENTION

Figure 2:
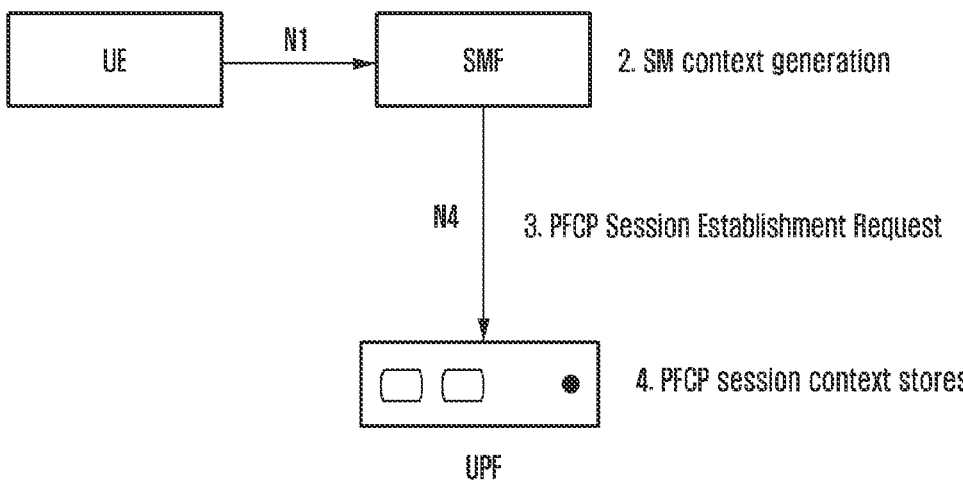
FIG. 2 is a diagram illustrating a PDU session, SM context, and relationship between PFCP session contexts according to an embodiment of the disclosure.

Hereinafter, preferred embodiments of the disclosure are described in detail with reference to the accompanying drawings. It is to be noted that the same reference numbers are used to refer to the same elements in the accompanying drawings. Furthermore, a detailed description of known functions or constructions that may make the subject matter of the disclosure vague will be omitted.

In this specification, in describing the embodiments, a description of technology contents that are well known in the art to which the disclosure pertains and that are not directly related to the disclosure is omitted in order to clearly transfer the subject matter of the disclosure without obscuring the subject matter of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same components.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable storage memory that can direct a computer or other programmable data processing equipment to implement a function in a particular manner, such that the instructions stored in the computer-usable or computer-readable memory produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or other programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application specific integrated circuit (ASIC), and the "unit" performs specific tasks. However, the term "unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card.

Hereinafter, a base station is the subject of resource assignment to a terminal, and may be at least one of a Node B, a base station (BS), an eNode B (eNB), a gNode B (gNB), a wireless access unit, a base station controller, and a node in a network. The terminal may include a user equipment (UE), a mobile station (MS), a cellular phone, a smartphone, a computer, or a multimedia system capable of performing a communication function. Furthermore, an embodiment of the disclosure may also be applied to other communication system having a technical background or channel form similar to an embodiment of the disclosure hereinafter described. Furthermore, an embodiment of the disclosure may also be applied to other communication system through some modifications in a range not greatly departing from the scope of the disclosure based on a decision of a person having skilled technical knowledge.

A term for identifying an access node, terms to denote network entities or network functions (NFs), terms to denote messages, a term to denote an interface between network entities, terms to denote various types of identification information, etc., which are used in the following description, have been exemplified for convenience of description. Accordingly, the disclosure is not limited to terms described later, and another term to denote a target having an equivalent technical meaning may be used.

Hereinafter, for convenience of description, some of terms and names defined in the 3rd generation partnership project long term evolution (3GPP LTE) standard may be used. However, the disclosure is not restricted by the terms and names, and may also be identically applied to systems that follow other standards.

Embodiments of the disclosure provide a method of allocating a PFCP session group ID to determine the recovery order of packet forwarding control protocol (PFCP) sessions managed by a session management function (SMF) when the corresponding SMF fails or is replaced.

Figure 1:
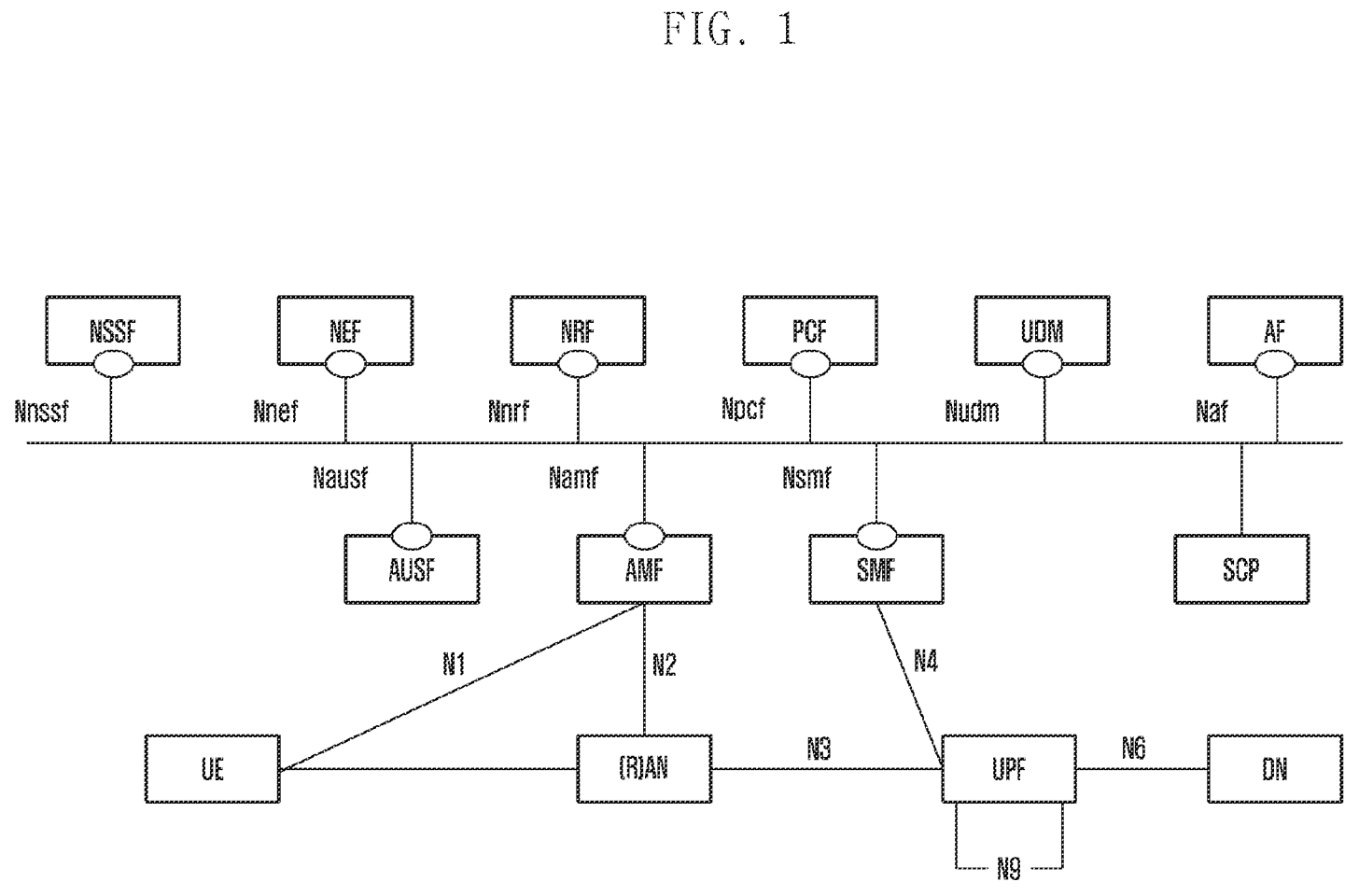

FIG. 1 is a diagram illustrating a structure of a 5G network according to an embodiment of the disclosure.

With reference to FIG. 1, network entities or network nodes constituting a 5G network are described as follows.

A (radio) access network ((R)AN) is the subject that performs the assignment of a radio resource to a terminal, and may be at least one of an eNode B (eNB), a gNode B (gNB), a Node B, a base station (BS), a NextGeneration radio access network (NG-RAN), a 5G-AN, a wireless access unit, a base station controller, and a node in a network. The terminal may include a user equipment (UE), a NextGeneration UE (NG UE), a mobile station (MS), a cellular phone, a smartphone, a computer, or a multimedia system capable of performing a communication function. Furthermore, hereinafter, an embodiment of the disclosure is described as an example of a 5G system, but an embodiment of the disclosure may also be applied to other communication system having a similar technical background. Furthermore, an embodiment of the disclosure may also be applied to other communication system through some modifications in a range not greatly departing from the scope of the disclosure based on a decision of a person having skilled technical knowledge.

As the 4G system evolves into the 5G system, a wireless communication system defines a NextGen core (NG core), that is, a new core network, or a 5G core network (5GC). The new core network has produced all the existing network entities (NEs) as a network function (NF) by virtualizing all the existing network entities. According to an embodiment of the disclosure, the network function may mean a network entity, a network component, or a network resource.

According to an embodiment of the disclosure, the 5GC may include NEs illustrated in FIG. 1. The disclosure is not limited to the example of FIG. 1, and the 5GC may include a larger number or smaller number of NFs than the NFs illustrated in FIG. 1.

According to an embodiment of the disclosure, an access and mobility management function (AMF) may be a network function for managing the mobility of a UE.

According to an embodiment of the disclosure, a session management function (SMF) may be a network function for managing a packet data network (PDN) connection that is provided to a UE. The PDN connection may be denoted as the name of a protocol data unit (PDU) session.

According to an embodiment of the disclosure, a policy control function (PCF) may be a network function that applies, to a UE, a service policy, billing policy, and policy for a PDU Session, of a mobile communication operator.

According to an embodiment of the disclosure, unified data management (UDM) may be a network function that stores information on a subscriber.

According to an embodiment of the disclosure, a network exposure function (NEF) may be a function that provides information about a UE to a server outside a 5G network. Furthermore, the NEF may provide a function for storing, in a UDR, information necessary for a service in a 5G network by providing the information.

According to an embodiment of the disclosure, a user plane function (UPF) may be a function for performing the role of a gateway that transfers user data (PDU) to a data network (DN).

According to an embodiment of the disclosure, a network repository function (NRF) may perform a function for discovering an NE.

According to an embodiment of the disclosure, an authentication server function (AUSF) may perform UE authentication in a 3GPP access network and non-3GPP access network.

According to an embodiment of the disclosure, a network slice selection function (NSSF) may perform a function for selecting a network slice instance provided to a UE.

According to an embodiment of the disclosure, a data network (DN) may be a data network over which a UE transmits and receives data in order to use a service of a network operator or a 3rd party service.

FIG. 2 is a diagram illustrating a PDU Session, SM context and relationship between PPCP session contexts according to an embodiment of the disclosure.

With reference to FIG. 2, when the UE creates one PDU session, the SMF may create information related to the PDU session into one SM context and store the SM context in the SMF. In order to handle (control) the PDU session, the SMF may create one PFCP session between the SMF and the UPF, create related information in the form of a PFCP session context and transmit it to the UPF, and the UPF may store it.

FIG. 3 is a diagram illustrating the information element (IE) of an existing group ID.

With reference to FIG. 3, the first octet of the IE of the group ID may include type information. For example, the type of group ID may be 291.

The second octet may include length information.

The last octet may include the group ID.

Figure 4:
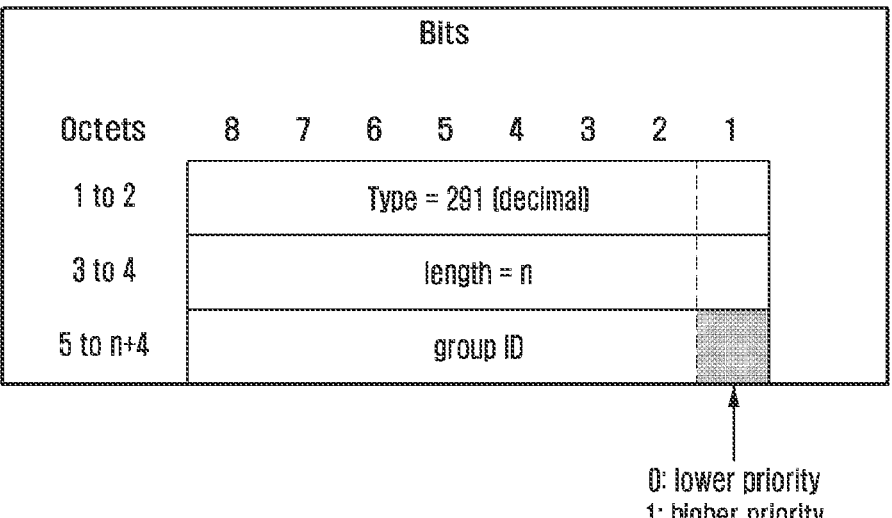
FIG. 4 is a diagram illustrating an example of a method for indicating the priority of a group as the last bit of a basic group ID according to an embodiment of the disclosure.

FIG. 4 is a diagram illustrating an example of a method for indicating the priority of a group as the last bit of a basic group ID according to an embodiment of the disclosure.

With reference to FIG. 4, two priorities, low priority and high priority, may be represented using the last bit of the group ID octet.

The octets and bits of the IE of the group ID in FIG. 4 may be the same/similar to the constitution of the IEs described in the part related to FIG. 3 above. However, the last bit of the last octet including the group ID may include information to indicate priority as described above.

FIG. 5 is a diagram illustrating an example of a method for defining a new IE for a group ID according to an embodiment of the disclosure.

With reference to FIG. 5, the first octet of the IE of the group ID may include type information.

For example, the type of priority of group ID may be 29x. "x" may be any integer from 1 to 9.

The second octet may include length information.

Also, the last octet may include priority of group ID.

The priority of two or more groups may be configured using this method. [Table 1] and [Table 2] below each show an example of session management (SM) context and PPCP session context including priority of group ID.

TABLE 1

| | SM context |
|---|---|
| Attribute name | Description |
| pduSessionId | This IE shall contain the PDU Session ID. |
| Dnn | This IE shall contain the UE requested DNN of the PDU session. |
| selectedDnn | This IE shall be present, if another DNN other than the UE requested DNN is selected for this PDU session. |
| . | . |
| . | . |
| . | . |
| nspuSupportInd | This IE shall be present and set to "true" if the enablePauseCharging in the SmContext data type is set to "true" and if the (H-)SMF and PSA UPF support Notify Start Pause of Charging via user plane |
| addRanTunnelInfo | This IE shall be present if the ranUnchangedInd IE is set to "true" in the SM contex retrieve request. |
| redRanTunnelInfo | This IE shall be present if the ranUnchangedInd IE is set to "true" in the SM context retrieve request. |
| Group Id | This IE may be included by the CP function to indicate the group identifier to which the PFCP session pertains (see clause 5.22). |
| Priority of Group Id | This IE may be included by the CP function to indicate the priority of the Group Id |

TABLE 2

| PFCP session context | |
| --- | --- |
| Information elements | Condition/Comment |
| Node ID | This IE shall contain the unique identifier of the sending Node. |
| CP F-SEID | This IE shall contain the unique identifier allocated by the CP function identifying the session. |
| Create PDR | This IE shall be present for at least one PDR to be associated to the PFCP session. |
| . | . |
| . | . |
| . | . |
| RAT Type | This IE may be present to provide the UP Function the current RAT Type for the PDN connection/PDU session to which this PFCP Session is corresponding for statistics purpose. |
| L2TP Tunnel Information | This IE shall be present if L2TP tunnel information is received from an AAA server, e.g. Radius/Diameter server or if it is configured in the CP function. |
| L2TP Session Information | This IE shall be present to include the information to establish a L2TP session, if an L2TP session needs to be established for this PFCP session. |
| Group Id | This IE may be included by the CP function to indicate the group identifier to which the PFCP session pertains (see clause 5.22). |
| Priority of Group Id | This IE may be included by the CP function to indicate the priority of the Group Id |

TABLE 3

| below is a table showing the group ID and priority of group ID included in the group context. | |
| --- | --- |
| Attribute name | Description |
| Group ID #1 | Priority of Group ID |
| Group ID #2 | Priority of Group ID |
| Group ID #3 | Priority of Group ID |

The priority of the PFCP session may be determined based on SM context information. Below is an example of SM context information considered to determine the priority of a PFCP session.

Always-on PDU Sessions
    alwaysOnGranted: true
PDU Sessions serving URLLC QoS Flows
    redundantPduSessionInfo: present
    addRanTunnelInfo: present
    redRanTunnelInfo: present
    addRedRanTunnelInfo: present
PDU Sessions with QoS Monitoring
    qosFlowList
        qosFlowProfile
            qosMonitoringReq: present
            qosRepPeriod: present.
PDU Sessions serving QoS Flows with high priority 5QI value
    qosFlowList
        qosFlowProfile
            5qi (5QI)

As seen in the example above, PDU Sessions including QoS Flows that require high QoS, such as end-to-end latency or reliability, such as Always-on PDU Sessions, PDU Sessions including URLLC quality of service (QoS) Flows, PDU Sessions performing QoS monitoring, and PDU sessions serving QoS Flows with high priority 5G QoS identifier (5QI) value, may be included in the PFCF Session Context Group with high priority.

Figure 6:
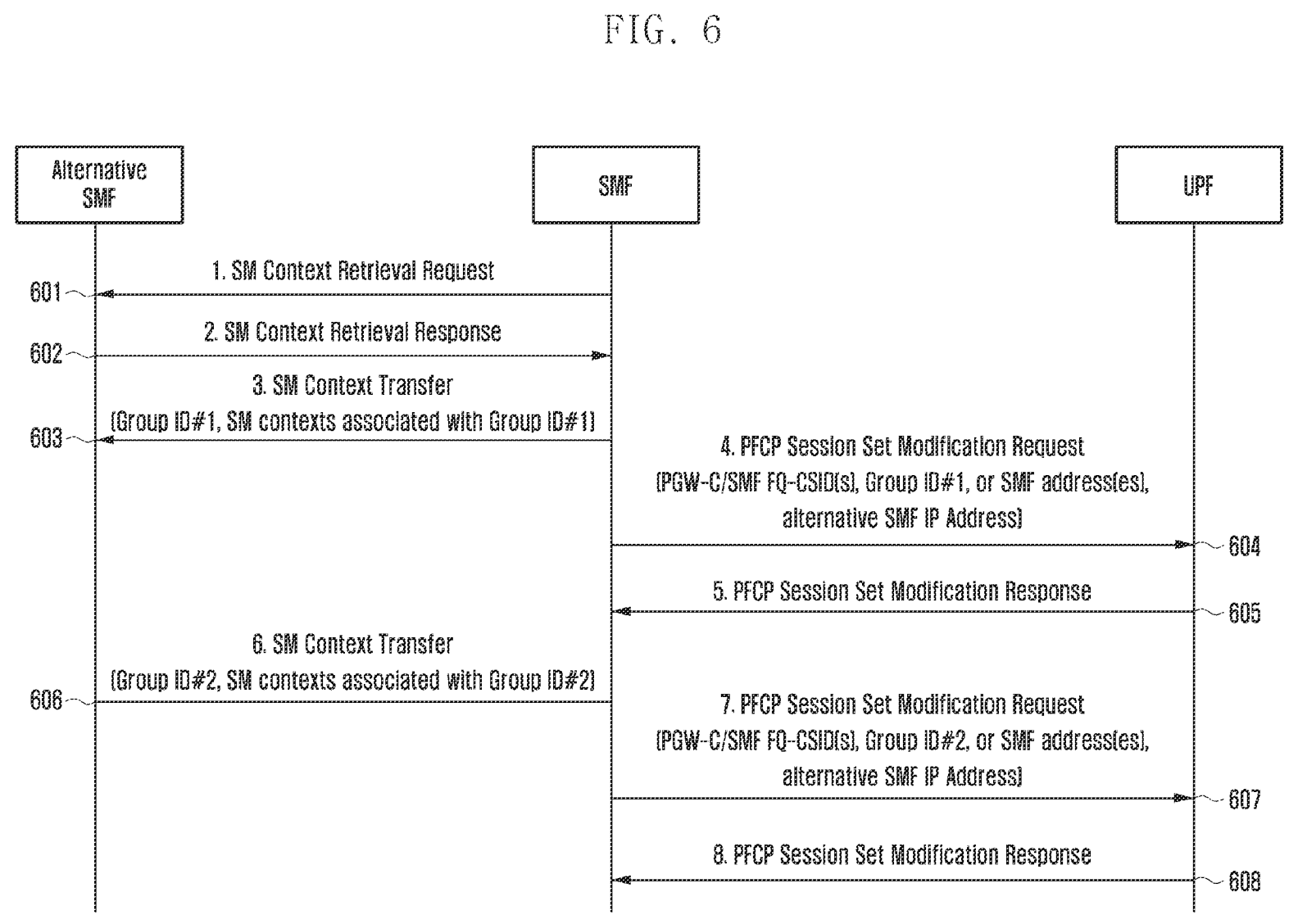

FIG. 6 is a diagram illustrating an example of a recovery procedure for SM contexts managed by the SMF before the SMP recovery procedure according to an embodiment of the disclosure.

A SMF recovery procedure is performed when the SMF fails or needs to be replaced. If there are PDU sessions managed by the SMF before performing the SMF recovery procedure, the corresponding SM contexts must be managed by one SMF among SMFs belonging to the same SMF set (or SMF group), that is, alternative SMF (or target SMF). This is called the SM context recovery procedure.

With reference to FIG. 6, in operation 601, the (previous, existing, current (original, initial)) SMF may transmit a request message to the alternative SMF in order to perform the recovery procedure for SM contexts. Depending on embodiments, the request message may be an SM context retrieval request message. This is a request to the alternative SMF to manage PDU sessions that are managed by the (existing) SMF. This message may include the number of PDU sessions requested for management or the amount of data in the SM context as parameters.

In operation 602, the alternative SMF may transmit an acknowledgment to the (existing) SMF through a response message. Depending on the embodiment, the response message may be an SM context retrieval response message. This means that alternative SMF has accepted the request to manage PDU sessions. Depending on embodiments, if the alternative SMF desires to change the group ID, the newly created group ID may be included in the response message. If the alternative SMF rejects the request, the response message may be a message including rejection information, and the alternative SMF may include a reason for the rejection in a cause value and transmit the same to the (existing) SMF.

In operation 603, if the (existing) SMF receives an acknowledgment from the alternative SMF in operation 602, the (existing) SMF may transmit the SM context to the alternative SMF. Depending on embodiments, the (existing) SMF may transmit PGW-C/SMF FQ-CSID(s) (fully qualified connection set identifier(s)), group ID(s), or SMF address(es), and one or more SM contexts corresponding thereto to the alternative SMF through the SM context transfer message. In this case, the SMF may first transmit the SM contexts corresponding to group ID #1 with the highest priority to the alternative SMF.

In operation 604, the (existing) SMF or alternative SMF may transmit a request message to the UPF handling PFCP sessions in order to perform the recovery procedure of PFCP sessions. Depending on embodiments, the request message may be a PFCP session set modification request message.

This may inform the UPF that the management of PFCP sessions associated with PGW-C/SMF FQ-CSID(s), group ID(s) or SMF address(es) has changed from the current SMF to the alternative SMF. If the alternative SMF assigns new group ID(s), the new group ID(s) may be included in the message and transmitted to the UPF. In this message, only the PFCP session contexts included in group ID #1 performed in operation 603 may be performed first.

In operation 605, the UPF may transmit an acknowledgment to the (existing) SMF or alternative SMF through a response message. Depending on embodiments, the response message may be a PFCP session set modification response message. Thereafter, the UPF may transmit a PFCP session report request message generated by the related PFCP session to the alternative SMF.

In operation 606, if the (existing) SMF receives the acknowledgment from the alternative SMF in operation 602, the (existing) SMF may transmit the PGW-C/SMF FQ-CSID(s), Group ID(s), or SMF address(es) and one or more SM contexts corresponding this to the alternative SMF through the SM context transfer message. In this case, the SM contexts corresponding to group ID #2, which has the second highest priority, may be transmitted to the alternative SMF.

In operation 607, the (existing) SMF or alternative SMF may transmit a request message to the UPF handling PFCP sessions in order to perform the recovery procedure of PFCP sessions. Depending on embodiments, the request message transmits a PFCP session set modification request message. This may inform the UPF that the management of PFCP sessions associated with PGW-C/SMF FQ-CSID(s), Group ID(s) or SMF address(es) has changed from the current SMF to the alternative SMF. If the alternative SMF assigns new group ID(s), the new group ID(s) may be included in the message and transmitted to the UPF. In this message, only PFCP session contexts included in group ID #2 performed in operation 606 may be performed.

In operation 608, the UPF may transmit an acknowledgment to the (existing) SMF or alternative SMF through a response message. Depending on embodiments, the response message may be a PFCP session set modification response message. Thereafter, the UPF may transmit a PFCP session report request message generated by the related PFCP session to the alternative SMF.

FIG. 7 is a diagram illustrating an example of packet flow handling that occurs during recovery of PFCP sessions according to an embodiment of the disclosure.

With reference to FIG. 7, when UL/DL data is generated from the UE/DN while restoring PFCP sessions, the UPF may determine whether to buffer or drop the packet by reviewing the priority of the group. For example, when the UPF buffer size is quite large or the processing load is not large, the UPF may buffer all packets and transmit them to the UE or DN after the recovery procedure. However, when the UPF buffer size is insufficient or the processing load is large, it may determine whether to buffer or drop packets based on the priority.

Figure 8:
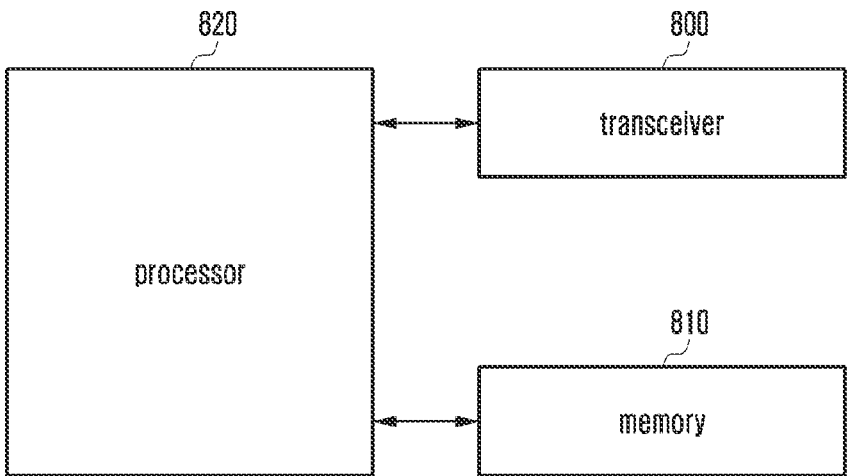
FIG. 8 is a diagram illustrating a structure of a terminal according to an embodiment of the disclosure.

FIG. 8 is a diagram illustrating a structure of a UE according to an embodiment of the disclosure. With reference to FIG. 8, the UE according to an embodiment of the disclosure may include a processor (controller) 820 configured to control general operations of the UE, a transceiver 800 including a transmitter and receiver, and a memory 810. However, it is not limited to the example described above. The UE may include more or less components than the components illustrated in FIG. 8.

According to an embodiment of the disclosure, the transceiver 800 may transmit and receive signals to and from network entities or other UEs. The signals transmitted and received to and from the network entities may include control information and data. Also, the transceiver 800 may receive the signals through wireless channels and output the signals to the processor 820 and may transmit signals output from the processor 820 through the wireless channels.

According to an embodiment of the disclosure, the processor 820 may control the UE to perform any one operation in the embodiments described above. Meanwhile, the processor 820, memory 810, and transceiver 800 may not necessarily have to be implemented as separate modules and may be implemented as one component, for example, as a single chip. Also, the processor 820 and the transceiver 800 may be electrically connected to each other. Also, the processor 820 may correspond to an application processor (AP), a communication processor (CP), a circuit, an application-specific circuit, or at least one processor.

According to an embodiment of the disclosure, the memory 810 may store data, such as basic programs for the operation of the UE, application programs, and configuration information. In particular, the memory 810 may provide the stored data in response to a request of the processor 820. The memory 810 may include a storage medium, such as read-only memory (ROM), random-access memory (RAM), a hard disk, a compact disk (CD)-ROM, or a digital versatile disk (DVD), or a combination of the storage media. Also, the memory 810 may include a plurality of memories. Also, the processor 820 may execute the embodiments of the disclosure described above based on the programs stored in the memory 810, the programs being configured to execute the embodiments of the disclosure described above.

Figure 9:
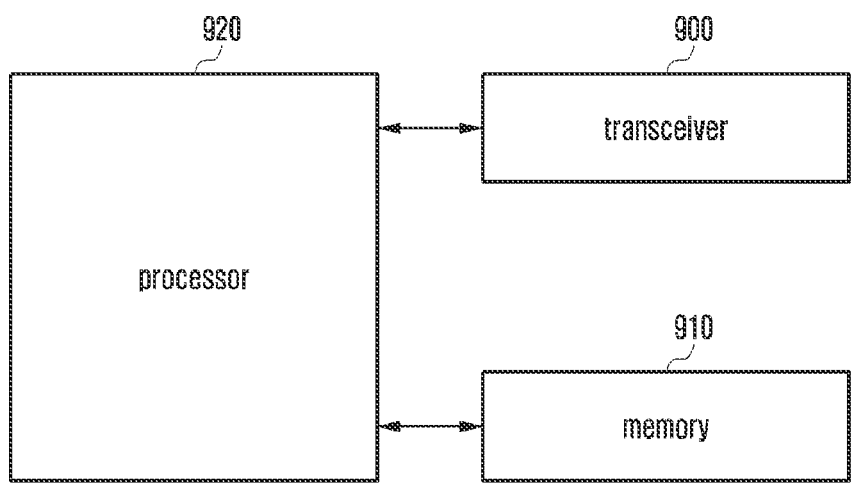
FIG. 9 is a diagram illustrating a structure of a network entity according to an embodiment of the disclosure.

FIG. 9 is a diagram of components of a network entity according to an embodiment of the disclosure.

With reference to FIG. 9, the network entity according to an embodiment of the disclosure may include a processor (controller) 920 configured to control general operations of the network entity, a transceiver 900 including a transmitter and receiver, and a memory 910. However, it is not limited to the example described above. The network entity may include more or less components than the components illustrated in FIG. 9.

According to an embodiment of the disclosure, the transceiver 900 may transmit and receive signals to and from at least one of other network entities or the UE. The signals transmitted and received to and from the at least one of the other network entities or the UE may include control information and data.

According to an embodiment of the disclosure, the processor 920 may control the network entity to perform any one operation in the embodiments described above. Meanwhile, the processor 920, memory 910, and transceiver 900 may not necessarily have to be implemented as separate modules and may be realized as one component, for example, as a single chip. Also, the processor 920 and transceiver 900 may be electrically connected to each other. Also, the processor 920 may correspond to an application processor (AP), a communication processor (CP), circuit, an application-specific circuit, or at least one processor.

According to an embodiment of the disclosure, the memory 910 may store data, such as basic programs for the operation of the network entity, application programs, and configuration information. In particular, the memory 810 may provide the stored data in response to a request of the processor 920. The memory 810 may include a storage medium, such as ROM, RAM, a hard disk, CD-ROM, a DVD, etc., or a combination of the storage media. Also, the memory 810 may include a plurality of memories. Also, the processor 920 may execute the embodiments of the disclosure described above based on the programs stored in the memory 810, the programs being configured to execute the embodiments of the disclosure described above.

The network entity may be any one of a base station (RAN), AMF, SMF, UPF, PCF, NSGMF, NSSF, NSACF, UDM, and UDR.

It should be noted that the above-described constitution diagrams, the example diagrams of the transmission method of control/data signals, the example diagrams of the operation procedure, and the structural diagrams are not intended to limit the scope of the claims of the disclosure. That is, it shall not be interpreted that all components, entities, or operations described in the embodiments of the disclosure are essential configurations for executing the disclosure, and the disclosure may be realized to an extent to which the essence of the disclosure is not deteriorated, by including only some of the configurations described above. Furthermore, the embodiments of the disclosure may be operated by being combined with one another if necessary. For example, portions of the methods provided by the disclosure may be combined with each other to enable the network entity and the UE to operate.

The operations of the base station or the terminal described above may be realized by including a memory device storing corresponding program codes as a component of the base station or the UE device. That is, the base station or controller of the UE device may execute the operations described above, by reading and executing the program codes stored in the memory device by using the processor or a central processing unit (CPU).

The entities, various components of the base station or UE device, modules, etc. described in this specification may operate by using a hardware circuit, for example, a complementary metal oxide semiconductor-based logic circuit; firmware and software; and/or a hardware circuit, such as a combination of hardware, firmware, and/or software inserted into a machine-readable medium. For example, various electrical structures and methods may be executed by using electrical circuits, such as transistors, logic gates, and an application specific integrated circuit.

In case of being implemented in software, a computer-readable recording medium having one or more programs (software modules) recorded thereon may be provided. One or more programs stored in the computer-readable storage medium are configured to be executable by one or more processors in an electronic device. The one or more programs may include instructions for the electronic device to execute the methods according to the embodiments of the disclosure described in the claims and the specification.

The programs (software modules or software) may be stored in non-volatile memories including random access memory (RAM), flash memory, etc., read only memory (ROM), electrically erasable programmable ROM (EE-PROM), a magnetic disc storage device, compact Disc-ROM (CD-ROM), digital versatile discs (DVDs) or other optical storage devices, or magnetic cassettes. Alternatively, the programs may be stored in a memory composed of part or all of the memories described above. Also, each of the memories included in the memory may be provided in a multiple number.

Also, the programs may be stored in an attachable storage device that is accessible through a communication network such as Internet, intranet, local area network (LAN), wide LAN (WLAN), or storage area network (SAN), or communication network provided by a combination thereof. The storage device may access a device configured to perform the embodiment of the disclosure through an external port. Furthermore, a separate storage device on the communication network may access the device performing the embodiments of the disclosure.

In the afore-described embodiments of the disclosure, elements included in the disclosure are expressed in a singular or plural form according to the presented particular embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Although specific embodiments have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof. That is, it will be understood by one of ordinary skill in the art that various changes in form and details may be made based on the technical concept of the disclosure. Also, the respective embodiments may be combined to be implemented, when required. For example, portions of the methods provided by the disclosure may be combined with each other to enable the base station and UE to operate. Also, although the aforementioned embodiments of the disclosure are proposed based on a 5G or NR system, modifications to the embodiments of the disclosure, which do not deviate from the scope of the disclosure, may be applicable to other systems such as an LTE, LTE-A, or LTE-A-Pro system, etc.

Although specific embodiments have been described in the detailed description of the present disclosure, various modifications may be made without departing from the scope of the present disclosure. Thus, it will be apparent to one of ordinary skill in the art that the scope of the disclosure is not limited to the embodiments described herein and should be defined by the appended claims and their equivalents.

The invention claimed is:

1. A method performed by a session management function (SMF) in a wireless communication system, comprising:
   transmitting, to a second SMF, an SM context including a group identifier (ID);
   transmitting, to a user plane function (UPF), a message requesting a packet forwarding control protocol (PFCP) session context including the group ID; and
   receiving, from the UPF, a response message to the request message.

2. The method claim 1,
   wherein the group ID includes information about priority, and
   wherein the information about the priority is bit information.

3. The method of claim 1, wherein the SM context and the PFCP session context further include priority of the group ID.

4. The method of claim 1, further comprising:
   transmitting, to the second SMF, a message requesting recovery of the SM context; and
   receiving, from the second SMF, a message responding to the request.

5. A method performed by a user plane function (UPF) in a wireless communication system, comprising:

receiving, from a session management function (SMF), a message requesting a packet forwarding control protocol (PFCP) session context including a group identifier (ID); and transmitting, to the SMF, a response message to the request message, wherein an SM context including the group ID is transmitted from the SMF to a second SMF.

6. The method claim 5, wherein the group ID includes information about priority, and wherein the information about the priority is bit information.

7. The method of claim 5, wherein the SM context and the PFCP session context further include priority of the group ID.

8. The method of claim 5, wherein a message requesting recovery of the SM context is transmitted from the SMF to the second SMF; and wherein a message responding to the request is received from the second SMF to the SMF.

9. A session management function (SMF), comprising:

a transceiver capable of transmitting and receiving at least one signal; and a controller coupled with the transceiver, wherein the controller is configured to:

transmit, to a second SMF, an SM context including a group identifier (ID), transmit, to a user plane function (UPF), a message requesting a packet forwarding control protocol (PFCP) session context including the group ID, and receive, from the UPF, a response message to the request message.

10. The SMF claim 9, wherein the group ID includes information about priority, and wherein the information about the priority is bit information.

11. The SMF of claim 9, wherein the SM context and the PFCP session context further include priority of the group ID.

12. The SMF of claim 9, wherein the controller is further configured to:

transmit a message requesting recovery of the SM context to the second SMF; and receive, from the second SMF, a message responding to the request.

13. A user plane function (UPF), comprising:

a transceiver capable of transmitting and receiving at least one signal; and a controller coupled with the transceiver, wherein the controller is configured to:

receive, from a session management function (SMF), a message requesting a packet forwarding control protocol (PFCP) session context including a group identifier (ID), and transmit, to the SMF, a response message to the request message, wherein an SM context including the group ID is transmitted from the SMF to a second SMF.

14. The UPF of claim 13, wherein the group ID includes information about priority, and wherein the information about the priority is bit information.

15. The UPF of claim 13, wherein the SM context and the PFCP session context further include priority of the group ID.

* * * * *